US010665971B2

(12) United States Patent
Onodi et al.

(10) Patent No.: US 10,665,971 B2
(45) Date of Patent: May 26, 2020

(54) CABLE CONNECTOR AND CABLE TERMINATION

(71) Applicant: Woertz Engineering AG, Muttenz (CH)

(72) Inventors: Tamas Onodi, Thalwil (CH); Andreas Dreier, Nunningen (CH)

(73) Assignee: Woertz Engineering AG, Muttenz (CH)

( * ) Notice: Subject to any disclaimer, the term of this patent is extended or adjusted under 35 U.S.C. 154(b) by 0 days.

(21) Appl. No.: 16/125,876

(22) Filed: Sep. 10, 2018

(65) Prior Publication Data
US 2019/0081421 A1    Mar. 14, 2019

(30) Foreign Application Priority Data

Sep. 11, 2017   (DE) .................... 20 2017 004 743 U

(51) Int. Cl.
*H01R 12/61*  (2011.01)
*H01R 4/72*   (2006.01)
(Continued)

(52) U.S. Cl.
CPC ............ *H01R 12/613* (2013.01); *H01R 4/30* (2013.01); *H01R 4/38* (2013.01); *H01R 4/72* (2013.01);
(Continued)

(58) Field of Classification Search
CPC . H01R 4/36; H01R 11/09; H01R 4/30; H01R 4/38; H01R 4/62; H01R 4/70;
(Continued)

(56) References Cited

U.S. PATENT DOCUMENTS 3,187,088 A * 6/1965 Warner .................. H02G 15/24
                                                                174/91
3,441,658 A * 4/1969 Smith .................... H02G 15/10
                                                                174/88 R
(Continued)

FOREIGN PATENT DOCUMENTS

EP          875958 A1     11/1998

OTHER PUBLICATIONS

DIN 410212.
(Continued)

*Primary Examiner* — Edwin A. Leon
*Assistant Examiner* — Matthew T Dzierzynski
(74) *Attorney, Agent, or Firm* — Frost Brown Todd LLC

(57) ABSTRACT

Cable connectors for connecting two multicore cables are provided including a clamping sleeve, having a ceramic insulator with openings on each side of the sleeve, for accommodating core conductors. The clamping sleeve includes contact inserts passing through the clamping sleeve. Clamping elements are provided to clamp the core conductors to the contact inserts to electrically connect the multicore cables. The cable connector has a heat shrink tube that surrounds the clamping sleeve and the cables. Furthermore, cable termination including a clamping sleeve with a ceramic insulator with openings for core conductors is provided. Contact inserts are situated behind the openings to clamp the core conductors on the contact inserts establishing mechanical fixing of the core conductors on the clamping sleeve. The cable termination includes a heat shrink tube as according to the first aspect.

11 Claims, 10 Drawing Sheets

(51) Int. Cl.
  *H01R 11/09* (2006.01)
  *H01R 9/03* (2006.01)
  *H02G 15/18* (2006.01)
  *H02G 15/16* (2006.01)
  *H01R 4/30* (2006.01)
  *H01R 4/38* (2006.01)
  *H01R 12/63* (2011.01)
  *H02G 15/02* (2006.01)
  *H01R 4/36* (2006.01)

(52) U.S. Cl.
  CPC ............... *H01R 9/03* (2013.01); *H01R 11/09* (2013.01); *H01R 12/63* (2013.01); *H02G 15/02* (2013.01); *H02G 15/16* (2013.01); *H02G 15/1806* (2013.01); *H01R 4/36* (2013.01)

(58) Field of Classification Search
  CPC ........ H01R 9/24; H01R 12/613; H01R 12/63; H01R 12/70; H01R 13/03; H01R 13/5216; H01R 13/527; H01R 13/6215; H01R 4/72; H01R 9/18; H01R 9/2416; H02G 15/10; H02G 15/24; H02G 15/18; H02G 15/1806; H02G 15/02; H02G 15/046; H02G 15/16
  See application file for complete search history.

(56) References Cited

U.S. PATENT DOCUMENTS

| | | | | |
|---|---|---|---|---|
| 3,864,013 A * | 2/1975 | Levy | ................ | H01R 4/20 439/724 |
| 4,006,288 A * | 2/1977 | Stevens | ................ | H02G 15/10 174/73.1 |
| 4,207,429 A * | 6/1980 | Ward | ................ | H02G 15/18 156/49 |
| 4,388,523 A * | 6/1983 | Keep, Jr. | ................ | H05B 3/06 174/77 R |
| 4,822,953 A * | 4/1989 | John | ................ | H01B 7/29 174/84 R |
| 4,831,214 A * | 5/1989 | Wilck | ................ | H02G 15/1806 156/49 |
| 5,588,880 A * | 12/1996 | Wood | ................ | H01R 4/38 439/709 |
| 5,727,314 A * | 3/1998 | Ashcraft | ................ | H01R 4/36 29/884 |
| 6,071,145 A * | 6/2000 | Toly | ................ | H01R 13/53 439/465 |
| 6,997,758 B2 * | 2/2006 | De Buyst | ................ | H01R 4/36 174/88 R |
| 8,410,366 B2 * | 4/2013 | Tognali | ................ | H02G 15/10 174/84 R |
| 8,716,600 B2 * | 5/2014 | Kehl | ................ | H01R 4/70 174/84 R |
| 8,791,605 B2 * | 7/2014 | Lieberman | ................ | G06F 1/26 307/147 |
| 9,172,167 B2 * | 10/2015 | King, Jr. | ................ | H01R 13/03 |
| 9,203,191 B2 * | 12/2015 | Bogart | ................ | H01R 13/213 |
| 9,419,352 B2 * | 8/2016 | Hyder | ................ | H01R 9/2416 |
| 9,472,865 B2 * | 10/2016 | Frank | ................ | H01R 4/307 |
| 9,941,612 B2 * | 4/2018 | Emerson | ................ | H01R 4/70 |
| 10,109,947 B2 * | 10/2018 | Sethi | ................ | H01R 13/5216 |
| 10,263,410 B2 * | 4/2019 | Fukumoto | ................ | H01B 13/32 |
| 2015/0147500 A1 * | 5/2015 | Toy | ................ | C08L 67/02 428/35.1 |
| 2016/0372241 A1 * | 12/2016 | Wakabayashi | ................ | H01B 7/285 |
| 2017/0169919 A1 * | 6/2017 | Wakabayashi | ................ | B60R 16/0207 |
| 2018/0026383 A1 * | 1/2018 | Stauch | ................ | H01B 1/023 439/804 |
| 2019/0103703 A1 * | 4/2019 | Yaroslavskiy | ................ | H01R 13/6215 |

OTHER PUBLICATIONS

Eyerer et al., "Polymer Engineering Technologien und Praxis," Springer-Velag, 2008 p. 111, catchword "Keramisierende Polymere."
Thompson et al., "In the Firing Line," European Coatings Journal, 2006, 12, pp. 34-39.

* cited by examiner

CABLE CONNECTOR AND CABLE TERMINATION

FIELD OF THE INVENTION

The invention relates to a cable connector for connecting two multicore cables, namely, two flat cables or one flat cable and one round cable. The invention further relates to a cable termination for the insulating termination of a multicore flat cable or round cable.

BACKGROUND OF THE INVENTION

In tunnels and buildings, safety installations are known in which either flat cables are electrically connected to flat cables or flat cables are electrically connected to round cables via cable clamps or the like, for example to form a through line or an extended branch line. In addition, in such installations it is known to provide cable end pieces, for example at the end of through lines.

According to the DIN 410212 standard for functional integrity of electrical line systems, these systems must be designed in such a way that the safety-related installations and devices remain functional for a sufficient period of time in the event of fire. Retention of functionality must be met under functional integrity class E90 or E30, according to which functional integrity is ensured for 90 or 30 minutes, respectively.

The publication EP 875 958 relates to a cylindrical spacer made of ceramic, into which pressed-together conductor pairs are inserted. The electrical connection between the conductor pairs is established by metallic cable couplers into which cable bundles are inserted from both sides, which are then pressed together by crimping the couplers. A heat shrink tube which in the shrunken state rests against the spacer or against the inserted cable ends is pushed over the entire assembly.

BRIEF DESCRIPTION OF THE INVENTION

A first aspect relates to cable connectors for connecting two multicore cables, namely, two flat cables or one flat cable and one round cable. The cable connector includes a clamping sleeve, having a ceramic insulator with at least two openings, one on each side of the clamping sleeve, for accommodating core conductors. The clamping sleeve includes at least two contact inserts that pass through the clamping sleeve at corresponding openings on both sides. Clamping elements are associated with each of the least two contact inserts in order to clamp the core conductors on one side or the other side of the contact inserts, and thus to establish electrical contact between the clamping sleeve and the multicore flat cable or round cable, thereby connecting the two cables. The cable connector also includes a heat shrink tube that envelops the entering portions of the cables and the clamping sleeve, and in the shrunken state lies tightly against an outer contour of the clamping sleeve and an outer contour of the portion of the cables that enter the clamping sleeve.

A second aspect relates to a cable termination for the insulating termination of a multicore flat cable. The cable termination includes a clamping sleeve that includes a ceramic insulator with at least two openings on one side of the clamping sleeve for accommodating core conductors. The clamping sleeve includes at least two contact inserts situated behind the openings, a clamping element being associated with each of the at least two contact inserts in order to clamp the core conductors on the contact inserts and thus establish mechanical fixing of the core conductors on the clamping sleeve so as to electrically insulate them from one another, and thus to terminate the cable. The cable termination also includes a heat shrink tube that envelops the entering portion of the cable and the clamping sleeve, and in the shrunken state lies tightly against an outer contour of the clamping sleeve and an outer contour of the portion of the cable that enters the clamping sleeve.

GENERAL DESCRIPTION, ALSO WITH REGARD TO OPTIONAL EMBODIMENTS OF THE INVENTION

A first aspect relates to cable connectors for connecting two multicore cables, namely, two flat cables or one flat cable and one round cable. Flat cables are cables whose cores are situated in parallel to one another in a plane. The parallel arrangement of the cores makes a short circuit between the core conductors unlikely, even in the event of fire, in comparison to round cables whose cores extend in the longitudinal direction of the cable, twisted in a customary manner. In this context, "core" refers to a core conductor together with its core insulation.

The cable connector includes a clamping sleeve which in turn includes a ceramic insulator. The insulator is fireproof since it is made of ceramic. In this context, "ceramic" generally means inorganic, nonmetallic, polycrystalline materials that undergo a sintering process during burning. Materials such as glass ceramic and composite ceramic also fall under the term "ceramic." The term "fireproof" means that the insulator does not lose its electrical insulation properties and remains dimensionally stable, even at temperatures typical for fire (for example, 150° C. or higher). Due to its ceramic design, the insulator itself is also watertight and resistant to penetration by dust. A typical ceramic insulator achieves seal-tightness against liquids and/or dust that meets protection class IP20.

The ceramic insulator has at least two openings, one on each side of the clamping sleeve, for accommodating core conductors. The openings are dimensioned in such a way that their cross section corresponds at least to the diameter of a core conductor, or at least to the diameter of a cable core.

The clamping sleeve includes at least two contact inserts that pass through the clamping sleeve at corresponding openings on both sides. The contact inserts are thus inserted, for example, through through holes in the ceramic insulator.

The contact inserts are situated in such a way that the core conductors of one cable may be guided into the area of the contact insert through the opening on one side of the ceramic insulator, and that the core conductors of the other cable may be guided into the area of the contact insert on the other side of the ceramic insulator.

The contact inserts inserted into the insulator are kept insulated from the insulator, even in the event of fire. The contact inserts are made of metal, for example, and rest against the ceramic insulator or are tightly enclosed, at least partially, by same and, for example, fixed in their seat on the insulator. As a result, the contact inserts cannot slip or come loose from the ceramic insulator, even in the event of fire.

Clamping elements are associated with each of the at least two contact inserts in order to clamp the core conductors on one side or the other side of the contact inserts, and thus to establish electrical contact between the clamping sleeve and the multicore flat cable or round cable, thereby connecting the two cables.

The clamping takes place, for example, by clamping the core conductors between the contact insert and the clamping element, for example a screw or the like. Since the core conductors and not the cable cores, for example, are clamped (corresponding to the conductor and the surrounding (plastic) insulating layer), this ensures that in the event of fire the clamping contact is not detached by melting of the nonfireproof insulating layer.

The cable connector also includes a heat shrink tube that envelops the entering portions of the cables and the clamping sleeve, and in the shrunken state lies tightly against an outer contour of the clamping sleeve and an outer contour of the portion of the cables that enters the clamping sleeve.

The portions of the flat cable or round cable that enter the clamping sleeve are essentially understood to mean cable cores of the round cable or flat cable that are not enveloped by the cable sheathing of the flat cable or round cable. However, the entering portion may also include several centimeters of the flat cable or round cable together with the sheathing.

A heat shrink tube is a plastic tube that contracts greatly under the action of heat. The product introduced into the tube prior to the heating is thus electrically insulated from its surroundings and protected from mechanical damage.

To establish the connection of the cables via the cable connector, the clamping sleeve is inserted into the heat shrink tube in the nonshrunken state. The heat shrink tube is then heated in the area around the clamping sleeve by means of a hot air gun, for example. The heated locations contract and form an insulating film around the portions of the at least one flat cable and/or round cable that enter the cable clamp, or around the cable clamp itself. In particular in embodiments in which the contact inserts are not completely enveloped by the ceramic insulator, these exposed locations are protected from water or dust by the tightly fitting heat shrink tube.

The heat shrink tube provides the entire cable connector with additional protection from mechanical damage and/or penetration of liquids such as water in the form of splash/spray or running water. Due to the combination of a compact clamping sleeve having the fireproof insulator which keeps the electrically conductive parts of the clamping sleeve insulated from one another, and the heat shrink tube, a cable connector is provided that is suitable for functional integrity class E90 and that also has a degree of protection from penetration of dust/liquids according to IP68. In addition, the heat shrink tube is used to protect from contact with the electrical contacts, and thus also increases the operating safety during connection of two cables.

A second aspect relates to a cable termination for the insulating termination of a multicore flat cable. The cable termination includes a clamping sleeve, having a ceramic insulator with at least two openings on one side of the clamping sleeve for accommodating core conductors. The openings lead into the ceramic insulator, for example, and end there. Also for the cable termination, the diameter of the openings is selected in such a way that either one core conductor or the entire core of a flat cable may be guided into the opening.

The clamping sleeve includes at least two contact inserts situated behind the openings, a clamping element being associated with each of the at least two contact inserts in order to clamp the core conductors on the contact inserts and thus establish mechanical fixing of the core conductors on the clamping sleeve so as to electrically insulate them from one another, and thus to terminate the cable. The contact inserts, the same as the cable connector, are tightly enclosed, at least partially, by the ceramic insulator, and thus rest against it in order to establish the insulating contact. In addition, the contact inserts are secured against slipping from the openings in the insulator. The core conductors, the same as the cable connector, are contacted by the clamping elements directly, i.e., without core insulation, and mechanically fixed. Thus, as described in conjunction with the cable connector, a loss of the clamping by melting of the core insulation in the event of fire is prevented.

The cable termination, the same as the cable connector, includes a heat shrink tube that envelops the entering portion of the cable and the clamping sleeve, and in the shrunken state lies tightly against an outer contour of the clamping sleeve and an outer contour of the cable that enters the clamping sleeve. The heat shrink tube thus forms a shrink cap with regard to the cable termination. As described for the cable connector, by use of the ceramic clamping sleeve and the heat shrink tube made of watertight material (plastic, for example), the cable termination may be referred to as "watertight" and "fireproof." In addition, the cable termination in this form results in class E90 functional integrity in the event of fire, and class IP68 protection from penetration of liquids or dust.

In some embodiments, the contact inserts of the cable termination or of the cable connector are conductive inserts made of metal. Contact inserts made of metal provide not only high electrical conductivity, but also high mechanical stability when a core conductor is clamped between the clamping element and the contact insert. When clamping elements such as metal screws are combined with metal contact inserts, this results in strong mechanical fixing of the core conductors to the contact inserts, even in the event of fire, since the metal-to-metal contact remains strong even under the effect of heat in a fire.

Ceramic is a fireproof, watertight material, as the result of which the insulator meets the "fireproof" and "watertight" requirements. Since the heat shrink tube is also made of a watertight material (plastic, for example), the entire cable connector or the entire cable termination may be referred to as "watertight" and "fireproof."

In some embodiments of the cable connector or of the cable termination, the heat shrink tube includes a thermoplastic material. Thermoplastic materials may be plastically deformed in a certain temperature range. The material of the heat shrink tube is plastically deformable, for example, in a temperature range far above room temperature (100-150° C., for example). The heat shrink tube includes, for example, such a thermoplastic material that does not undergo further deformation upon continued heating above the thermoplastic range (at temperatures typical for fire, for example), but instead remains dimensionally stable or at least undergoes no further expansion in the direction of the nonshrunken state.

In some embodiments of the cable termination or of the cable connector, the heat shrink tube includes polyethylene. Crosslinked polyethylene, for example, may be used here. In crosslinked polyethylene, cross chains form in the material upon heating, which lie over the object to be enfolded (in the present case, the clamping sleeve and the portion of the at least one flat cable or round cable that enters the clamping sleeve). Shrink tubes made of other polyolefins may also be used.

In any case the heat shrink tube, as mentioned, is made of watertight material.

In some embodiments of the cable connector, the insulator has the shape of an upright arch, the openings being inserted into the arch in such a way that the heat shrink tube in the shrunken state has essentially the same distance from each closest opening.

This arrangement is used to minimize the width of the clamping sleeve, and at the same time, to maintain the stability of the box standing on the two feet of the insulator. This minimization of the width reduces the transverse strain on the heat shrink tube extending over the clamping sleeve in the longitudinal direction, so that the material of the heat shrink tube is subjected to less stress. In addition, due to the shape of an upright arch, less ceramic material is required for the insulator, compared to other customary cuboidal shapes of the clamping sleeve.

In some embodiments of the cable connector, the ceramic insulator includes openings on both sides which are joined together by boreholes. The conductive contact inserts made of metal are inserted through the boreholes. The contact inserts thus begin at an opening on one side of the clamping sleeve, and end at an opening on the other side of the clamping sleeve.

In this arrangement, in each case one conductive insert, as a contact insert, electrically connects one opening on one on one side of the ceramic insulator to an oppositely situated opening on the other side of the ceramic insulator.

In this embodiment of the cable connector, the holes in the insulator are arranged in such a way that core conductors may be inserted into them from one side of the clamping sleeve and also from the other side of the clamping sleeve in order to electrically connect a cable on one side of the clamping sleeve to a cable on the other side of the clamping sleeve.

In some embodiments, the openings in the insulator only partially enclose the conductive inserts as contact inserts, so that the clamping element may be mounted on the conductive elements in the area that is not enclosed. The conductive inserts are enclosed by the insulator in the area of the openings in the insulator, for example, only at their bottom side or lateral faces, but not at their top side, so that a clamping element may be brought into a force-fit and/or form-fit connection with the conductive inserts from above (i.e., in the direction of the side opposite from the standing surface of the clamping sleeve) in order to clamp a core conductor between the clamping element and the conductive insert.

For example, a screw that can be screwed into a thread provided on the contact insert may be guided through the area that is not enclosed. This may be an Allen screw, a conventional screw with a beveled slot or a cross slot, or a screw with a flattened tip or a conventional tapered tip.

Clamping elements and conductive inserts as contact inserts are made of metal, for example.

In some embodiments of the cable connector, the openings in the insulator have a circular cross section, and the conductive inserts are designed as tubes that are inserted through the boreholes.

When two flat cables, or one flat cable and one round cable, are joined together by means of the cable connector, for example the core conductors are inserted into the openings in the insulator and the conductive inserts, designed as tubes, situated behind same. The tubes are typically made of metal. The core conductors are clamped at that location, against the side wall of the contact insert designed as a tube, by associated clamping elements. This takes place on both sides of the clamping sleeve.

In some embodiments of the cable connector in which the conductive inserts are formed as tubes and the clamping elements are screws, the tubes have at least one screw thread into which the screws may be screwed, so that they clamp a core conductor, inserted into the opening, between the screw and the inner side of the tube.

The cable connector, as mentioned above, connects a flat cable to a flat cable, or a flat cable to a round cable. For the connection of two flat cables, in the shrunken state the heat shrink tube lies tightly against the portion of the two flat cables and the clamping sleeve that enters the clamping sleeve, and for the connection of a round cable to a flat cable, the heat shrink tube lies tightly against the portion of the flat cable that enters the clamping sleeve and the portion of the round cable and the clamping sleeve that enters the clamping sleeve.

First, the flat cable is connected to the flat cable, or the flat cable is connected to the round cable, via the clamping sleeve, and the heat shrink tube is then pulled over the connection point and shrunk onto the connection point by the action of heat (hair dryer, hot air gun, blowtorch).

In some embodiments of the cable termination, the heat shrink tube is terminated on one side and is thus designed as a shrink cap.

In some embodiments of the cable termination, the cable termination extends over the clamping sleeve, provided as a cable end piece, and over the portion of the flat cable or round cable that is connected to the clamping sleeve and enters the clamping sleeve. Here, the heat shrink tube designed as a shrink cap is initially pulled over the clamping sleeve and the entering portion of the flat cable or round cable, and then shrunk on.

In some embodiments of the cable termination, the contact inserts have a cuboidal design and are made of metal, and have screw threads via which clamping elements designed as screws may be screwed in order to clamp the core conductors at a clamping point between the contact inserts and the ceramic insulator. In these embodiments, for example the top side of the cuboidal contact element (i.e. a cuboidal contact insert) is used as a support surface for a core conductor that is inserted into the clamping sleeve. In such embodiments the support surface is used as a clamping point.

In all embodiments of clamping sleeves, both a mechanical and an electrical connection is provided between the core conductors and the contact inserts. However, in the embodiments with a cable termination, the electrical connection between the contact inserts and the core conductors is more or less dispensible as the main purpose of the contact inserts is to provide a mechanical fixation of the core conductors within the ceramic insulator also in the case of fire to prevent short circuits.

In some embodiments of the cable termination and the cable connector, functional integrity, i.e., connection of the two cables without short circuits or insulating fixing of the core conductors to the cable end in the event of fire, is ensured by the ceramic design of the insulator and the metallic composition of the contact inserts and their direct embedding in the ceramic insulator.

In this context, direct embedding means that the contact inserts rest directly against the ceramic of the insulator without the combustible parts, such as plastic, being situated in between. Such plastic parts would melt in the event of fire and thus loosen the seat of the contact inserts in the ceramic insulator, as the result of which the contact inserts could come loose and the clamped core conductors could slip out of the clamping sleeve and trigger a short circuit.

The clamping elements are used for fixing the core conductors to the contact inserts (screws, for example), and are situated in such a way that the contact inserts that are inserted through the boreholes in the insulator connecting the openings are not able to slip out of the boreholes in the ceramic insulator in the longitudinal direction. In the embodiment in which the contact inserts are tubes, and the openings in the ceramic insulator only partially enclose the conductive inserts, the two screws provided at the front end and the rear end of the contact inserts, as clamping elements, protrude into the area that is not enclosed by the opening, so that when the tube slips in the borehole in the longitudinal direction, the screws run into the ceramic surrounding the borehole in each case on one side of the insulator or on the other side of the insulator, so that a longitudinal movement within the borehole is limited.

The clamping elements and the contact inserts are made of metal to ensure a firm seat of the core conductors on the clamping point, even in the event of fire.

In some embodiments, for the cable connection the screws, as clamping elements, that are guided from top to bottom through the insulator are screwed into the cuboid as contact inserts and thus likewise secure it against slipping in the longitudinal direction.

In some embodiments with the cable clamp as an end piece, the openings in the insulator have a conical cross section in order to guide the core conductors in the direction of the clamping point. As a result of the tapering cross section of the opening, cable cores together with core conductors that are inserted into these openings are deflected toward the top side of the cuboidal contact element (i.e. a cuboidal contact insert); during the guiding, an inserted cable core bends in such a way that its core conductor comes to rest on the support surface, even if the cable cores were possibly originally inserted at an unsuitable angle.

In some embodiments, a flat cable to be connected includes at least two core conductors, a fireproof core insulation layer, and an outer sheathing, wherein the core insulation layer contains insulation material that ceramifies in the event of fire, the core insulation layer is extruded directly onto at least one core conductor of the flat cable, and the outer sheathing includes silicone rubber. In addition, the core conductors enveloped by the ceramifying core insulation layer may be embedded in intermediate sheathing made of plastic, which in turn is enclosed by the outer sheathing. The intermediate sheathing imparts rigidity to the flat cable, and due to its elastic properties provides enough pressure force, even in the event of fire, to keep the core conductors spaced apart from one another.

The fireproof core insulation layer has an annular shape, for example. For the live core(s) and optionally also for the neutral conductor and/or the protective conductor, i.e., at least for one core of the flat cable, the core insulation contains insulation material that ceramifies in the event of fire, and that is extruded directly, i.e., without an additional intermediate layer, onto the conductor surface.

Insulation materials that ceramify in the event of fire are known in the prior art, for example from P. Eyerer et al., Polymer Engineering Technologien and Praxis [Polymer Engineering Technologies and Practice], Springer-Verlag, 2008, p. 111, keyword "ceramifying polymers," and K. W. Thomson et al., "In the firing line," European Coatings Journal, 2006, 12, pp. 34-39. The insulation material is, for example, a thermoplastic plastic having one or more additives that ceramify in the event of fire, and that form a ceramic crust when the plastic burns off. The additives may be, for example, silicate material, metal oxides or semimetal oxides (such as $SiO_2$, $Al_2O_3$), or other suitable ceramifying materials such as zinc borate, or mixtures thereof. The ceramifying plastic is applied as a melt, for example, directly to the surface of the core conductor, and annularly encloses the core conductors in cross section. When the plastic of the core insulation burns off in the event of fire, the ceramifying additive forms the stated insulating crust, which then ensures a certain degree of electrical insulation.

The outer sheathing made of silicone rubber protects the core conductors from contact with dust or water.

The cable connector may be inserted as a connecting element for connecting a through line to a branch line, may be inserted for connecting a feed line to a through line, and may be inserted for connecting multiple flat cables to a through line.

The cable termination may be inserted in order to terminate a branch line or a through line.

BRIEF DESCRIPTION OF THE DRAWINGS

The appended drawings illustrate exemplary embodiments of the various aspects of the invention. The drawings show the following.

The drawings and the description of the drawings refer to examples of the invention, and not to the invention itself.

DESCRIPTION OF EXEMPLARY EMBODIMENTS WITH REFERENCE TO THE DRAWINGS

Figure 1:
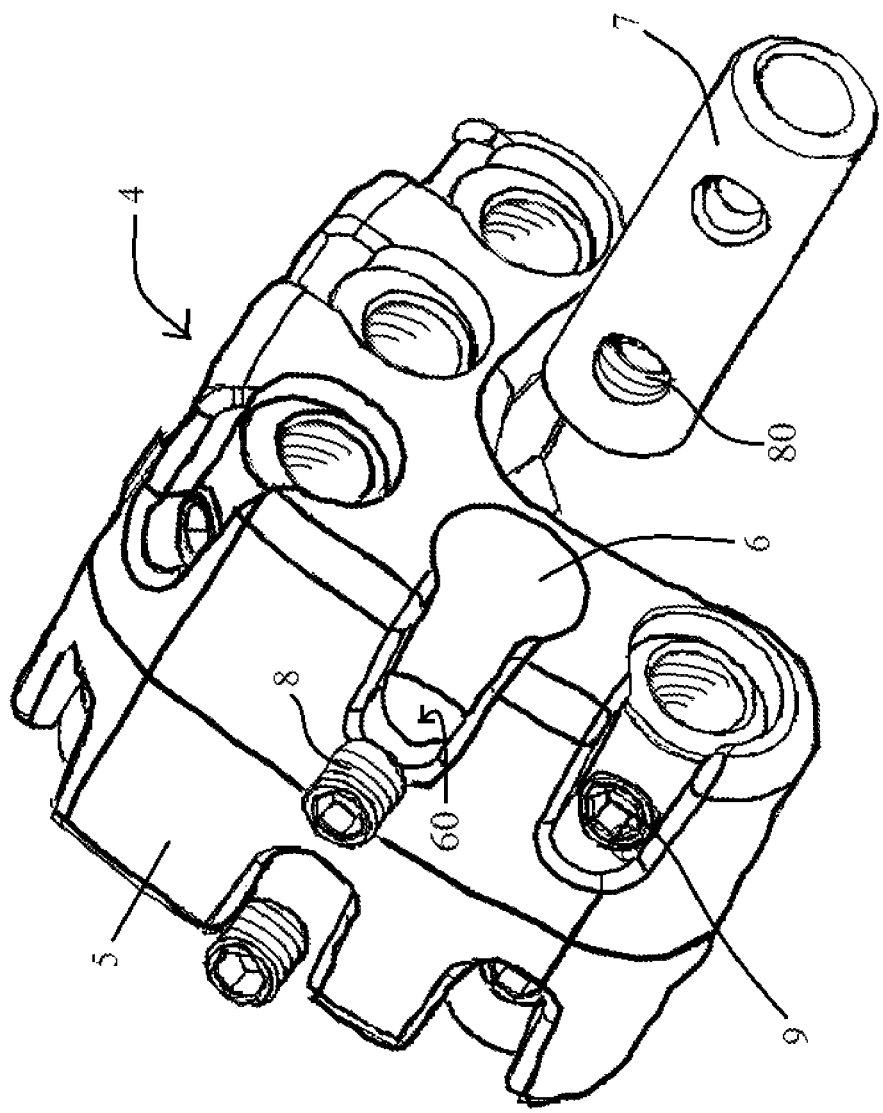
FIG. 1 shows a schematic illustration of a clamping sleeve together with an insulator in the shape of an upright arch, with tubular conductive contact inserts, in an exploded view.

The clamping sleeve 4 according to FIG. 1 has a ceramic insulator 5. The insulator 5 as shown in FIG. 1 has the shape of an upright round arch, the standing surface of the insulator being provided by the ends of the arch. Because the insulator 5 is made of ceramic, on the one hand it is fireproof and on the other hand is electrically insulating.

The insulator 5 on the front side and the rear side of its arched form has boreholes 60, with a plain cylindrical cross section, that extend into the insulator. The insulator 5 does not close off the boreholes 60 toward the top at the ends of the boreholes 60, thus forming openings 6 for accommodating contact inserts. The contact inserts are designed as conductive inserts in the form of metal tubes 7. The metal tubes 7 are inserted through the boreholes 60. Overall, the insulator 5 illustrated in FIG. 1 has boreholes 60, each with two openings 6, one on the front side and one on the rear side of the insulator, on each end of the boreholes. The openings 6 extend into the insulator, and have a cross section of approximately three-fourths of a circle, since they are enclosed only by approximately three-fourths by the insulator 5. A metal tube 7 for accommodating core conductors 21 (not shown in FIG. 1) on both sides of the metal tubes is inserted into each of the five boreholes.

The clamping sleeve 4 illustrated in FIG. 1 is typically used to connect two five-core cables having three phase conductors, a neutral conductor, and a protective conductor, for example.

Core conductors 21 (not illustrated in FIG. 1) that are inserted into the metal tubes 7, used as contact inserts, may be fixed to the metal tubes, inserted through the insulator, by clamping elements that are designed as metallic Allen screws 8. The Allen screws 8 may be guided over the portions of the screw threads 80, not delimited by the insulator 5, that pass through the opening 6 at the surface of the metal tubes 7, and screwed into the metal tubes 7 by means of a tool (Allen wrench) so that they clamp the core conductors 21 (not shown in FIG. 1), inserted into the metal tube 7, against the inner side walls of the metal tube 7. When this is done on both sides of a metal tube 7, two core conductors 21 (not shown in FIG. 1) are electroconductively connected to one another.

In addition, the Allen screws 8 inserted at the front side and rear side of the metal tubes 7 prevent the metal tubes 7 from slipping out of the ceramic insulator 5 in the longitudinal direction. Namely, when they are contacted by core conductors, the Allen screws 8 are far enough away from the metal tube 7 that they run into portions of the insulator 5 in each case during sliding back and forth in the borehole 60, and thus cannot move back and forth to the extent that they could slip out.

Figure 2:
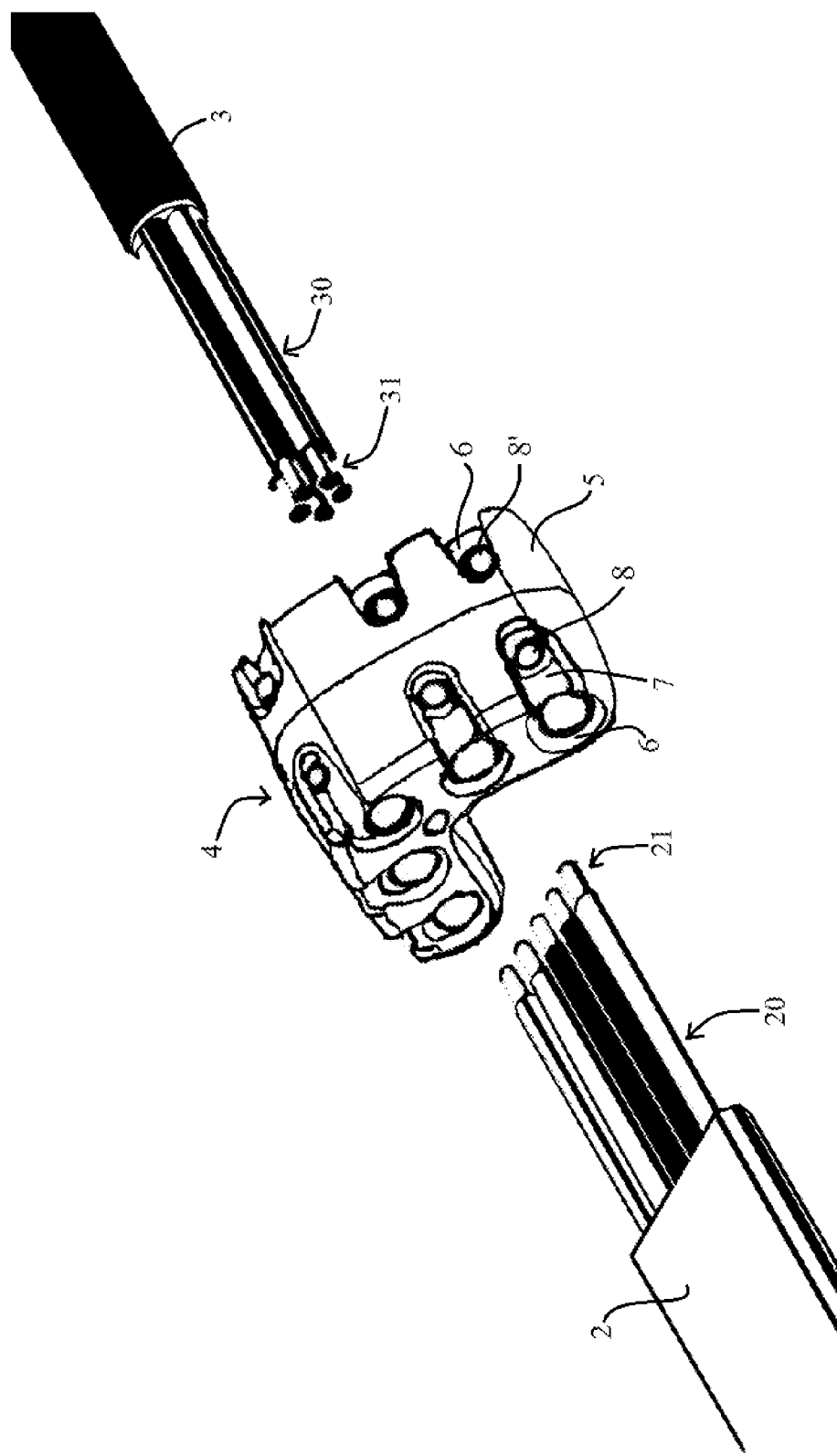
FIG. 2 shows the clamping sleeve from FIG. 1 together with a round cable and a flat cable that are to be connected to one another, one on each side of the clamping sleeve.

The clamping sleeve 4 illustrated in FIG. 1 is shown in FIG. 2 together with a flat cable 2 and a round cable 3. The clamping sleeve 4 at its front side is intended to contact the flat cable 2, and at its rear side, to contact the round cable 3. For this purpose, flat cable cores 20 together with their core conductors 21 are inserted into openings 6, and subsequently into the metal tubes 7, at the front side of the clamping sleeve 4 in order to fix the core conductors 21 to the metal tubes 7 at this location by means of the schematically illustrated Allen screws, as described in conjunction with FIG. 1.

The same applies for the cable cores 30 of the round cable 3, which together with their core conductors 31 are to be contacted by the clamping sleeve at the rear side of the clamping sleeve 4. When the clamping sleeve 4 contacts both the round cable 3 and the flat cable 2, it establishes an electrical connection between the round cable 3 and the flat cable 2.

Figure 3:
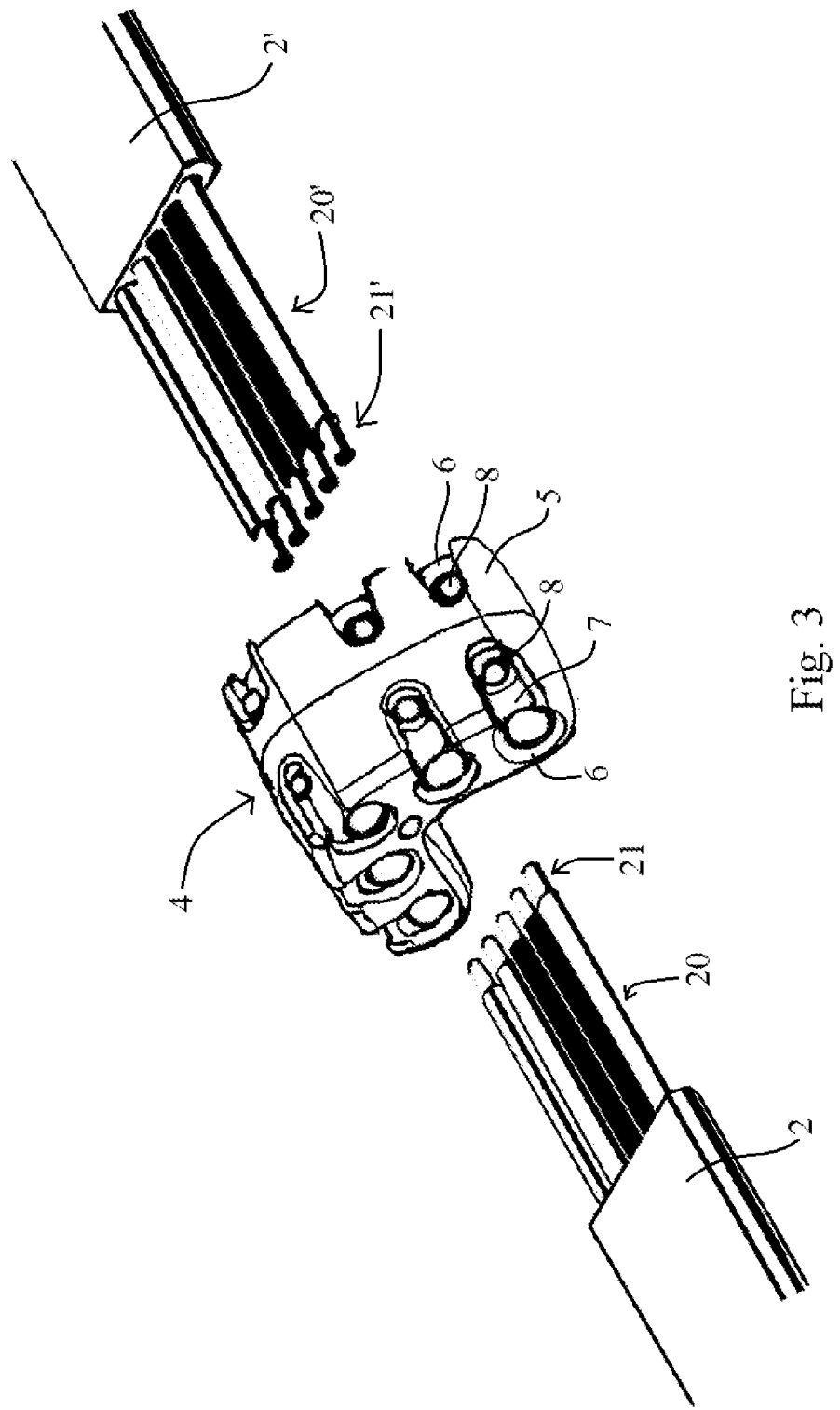
FIG. 3 shows the clamping sleeve from FIG. 1 together with two flat cables that are to be connected to one another, one on each side of the clamping sleeve.

Analogously to FIG. 2, FIG. 3 illustrates two flat cables 2, 2' whose cable cores 20, 20' and core conductors 21, 21' in each case are contacted by the clamping sleeve 4 to establish an electrical connection between the two flat cables 2, 2'.

Figure 4:
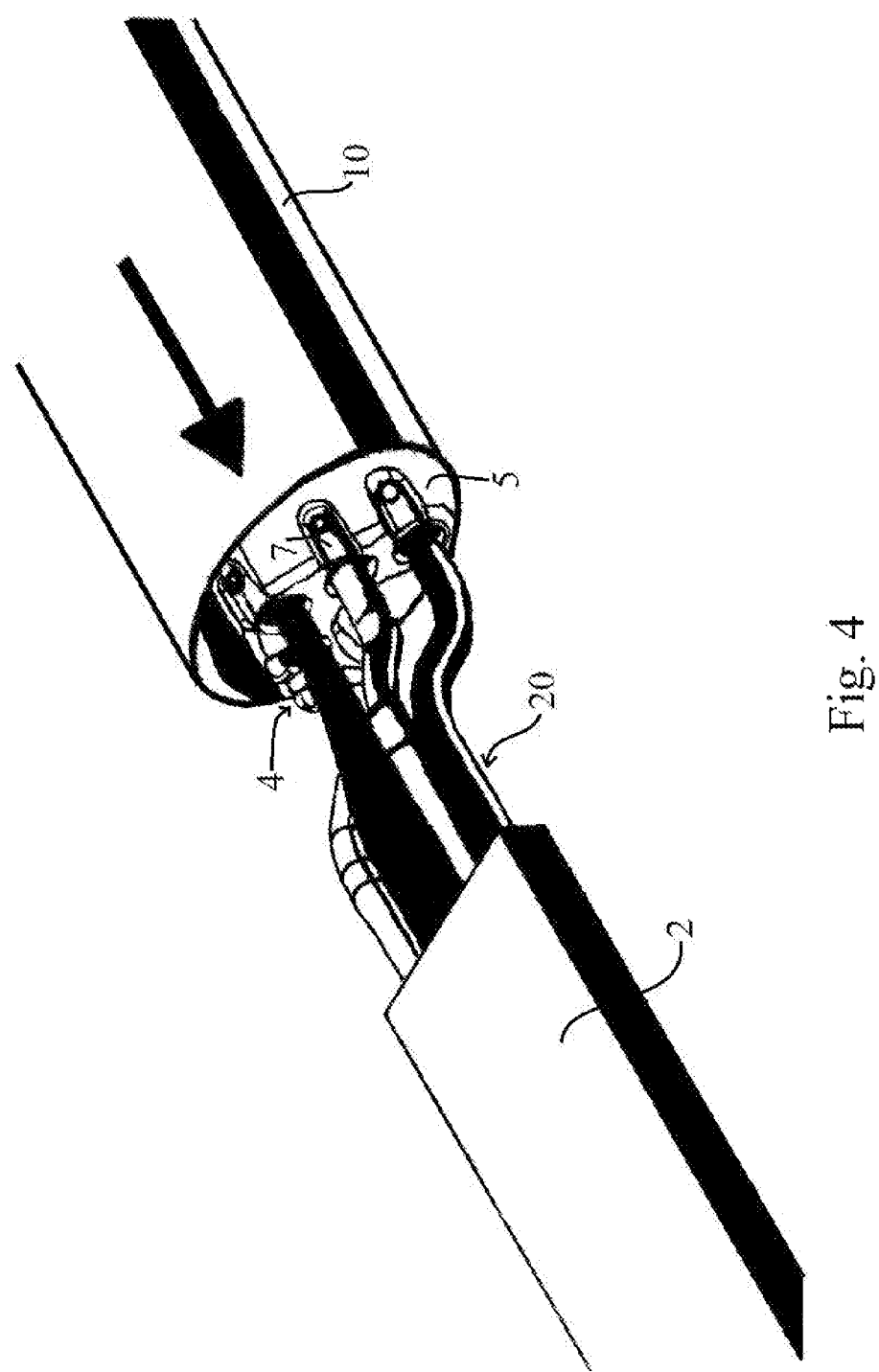
FIG. 4 shows the clamping sleeve from FIG. 1 together with a flat cable that is contacted by same, and a heat shrink tube that is pulled over the contact point.

FIG. 4 illustrates a clamping sleeve 4 that contacts the cable cores 20 of a flat cable 2. To produce the cable connector 1, not shown in FIG. 4, a heat shrink tube 10 is pulled over the clamping sleeve 4 and the portion of the flat cable 2 entering the clamping sleeve. This operation is depicted by an arrow in the direction of the flat cable 2 in FIG. 4.

Figure 5:
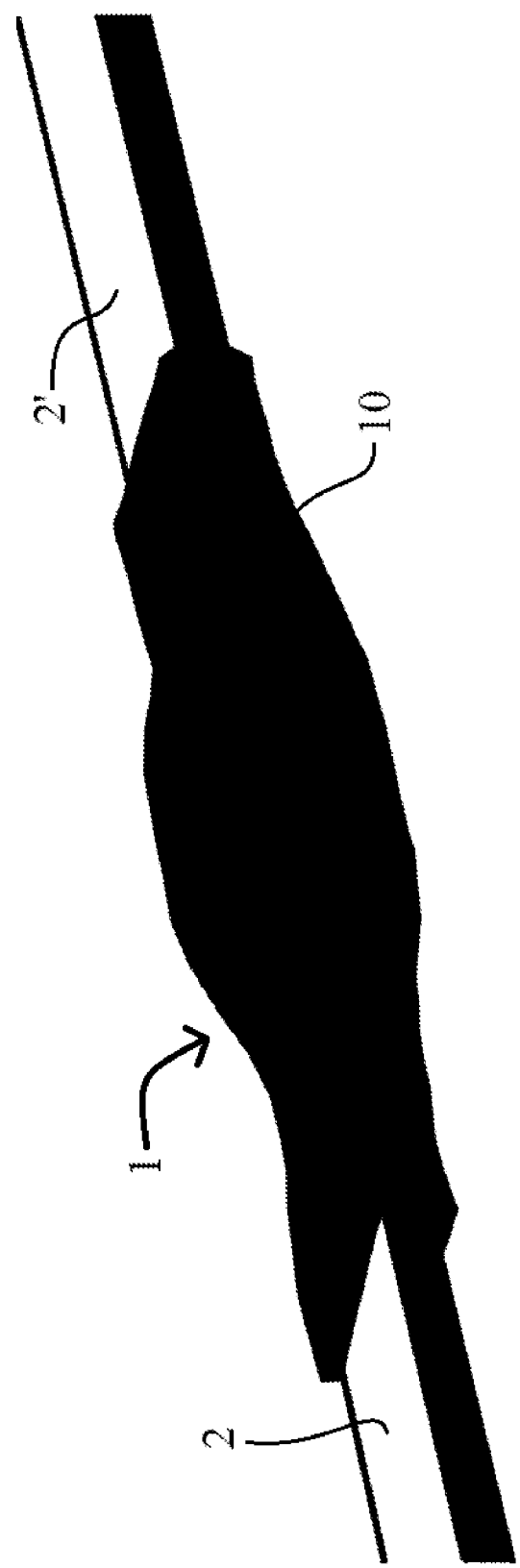
FIG. 5 shows an electrical connection of two flat cables by means of the cable connector, from the outside.

The heat shrink tube 10 illustrated in FIG. 5 is shrunk onto a clamping sleeve 4 (not illustrated in FIG. 5, but configured as in FIGS. 1 through 4) that joins two flat cables 2, 2' together, and also onto the portions of the flat cable 2, 2' entering the clamping sleeve 4. A cable connector 1 according to the first aspect of the invention is formed in this way. The cable connector is fireproof due to the ceramic insulator 5 of the clamping sleeve 4 (neither of which is visible beneath the heat shrink tube in FIG. 5), which keeps the cable cores 21 (not illustrated in FIG. 5) insulated from one another, and the metal-to-metal contacting of the core conductors 21, 21' with the metal tubes 7 by means of the metallic Allen screws 8. The heat shrink tube provides additional protection from penetration of liquids and dust, so that seal-tightness within the meaning of protection class IP68 is achieved. The cable connector may thus be referred to overall as "fireproof" and "watertight."

In all embodiments of clamping sleeves 4, 4' (see FIGS. 6, 7, and 8), both a mechanical and an electrical connection is provided between the core conductors 21, 21' and the contact inserts 7, 7'. However, in the embodiments with a cable termination 100 (see FIG. 10), the electrical connection between the contact inserts 7' and the core conductors 21 is more or less dispensible as the main purpose of the contact inserts 7' is to provide a mechanical fixation of the core conductors 21 within the ceramic insulator 5' also in the case of fire to prevent short circuits.

The term "contact element" used in the detailed description corresponds to the term "contact insert" used in the claims and the general description.

Figure 6:
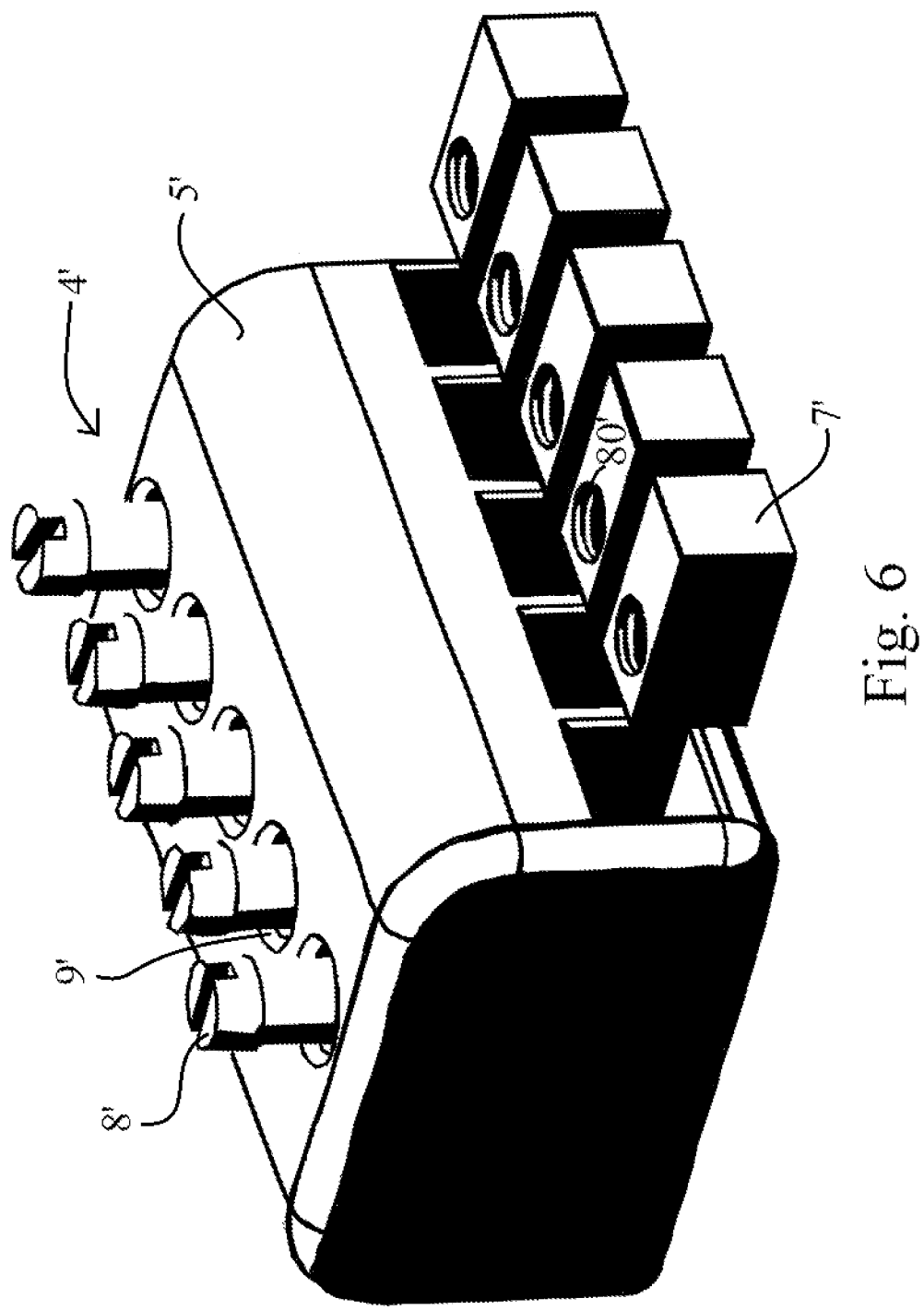
FIG. 6 shows a cuboidal clamping sleeve for the cable termination.
Figure 10:
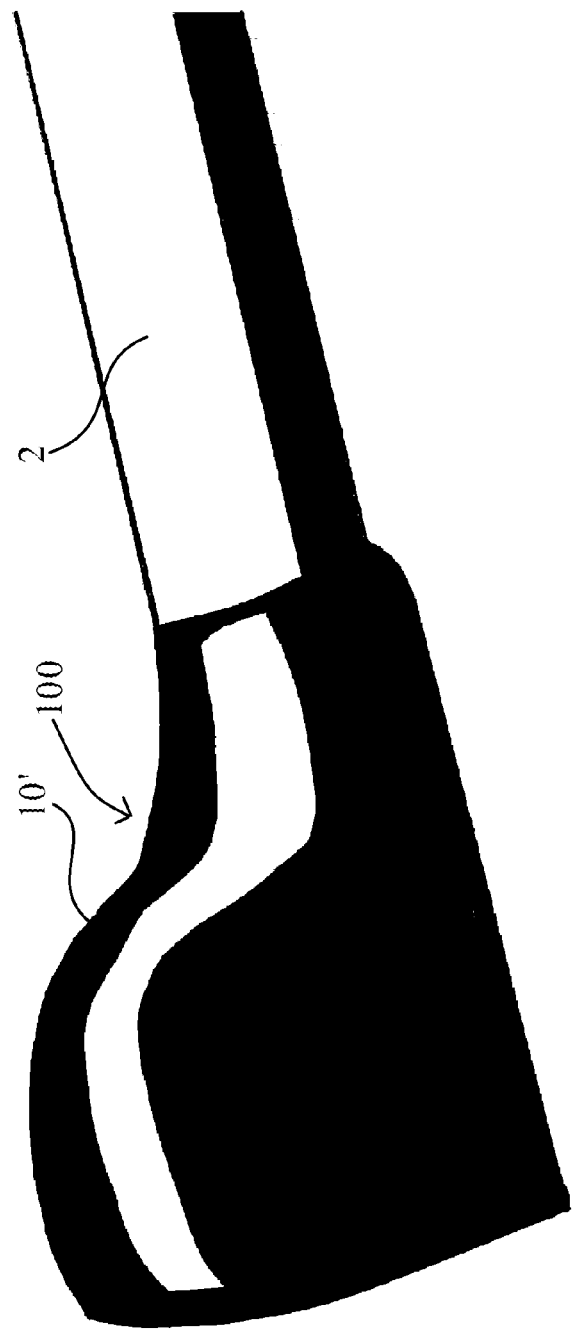
FIG. 10 shows the shrink cap from FIG. 9, shrunk over the clamping sleeve from FIGS. 7 and 8, and a flat cable, in order to produce the cable termination.

The clamping sleeve 4' schematically illustrated in FIG. 6 in an exploded drawing is part of a cable termination 100 (see FIG. 10). The clamping sleeve 4' has metallic cuboidal contact elements 7'. The task of the cuboidal contact elements 7' is to clamp core conductors 21, 31 (not illustrated in FIG. 6), inserted into the clamping sleeve 4', between the interior of the ceramic insulator 5' of the clamping sleeve 4' and the clamping sleeve itself as a metal-to-metal contact. The clamping is produced by metallic slotted screws 8' that are guided through screw holes 9 in the insulator 5' to screw threads 80' on the cuboidal contact elements 7'. The cuboidal contact elements 7' are inserted into cavities in the insulator 70'. The cuboidal contact elements 7' are fixed inside the clamping sleeve 4' and the ceramic insulator 5' by the slotted screws 8'. This results in a slot between the cuboidal contact elements 7' and the upper edges of the cavities in the insulator 70'. The core conductors 21, 31 (not illustrated in FIG. 6) may be clamped in this slot.

Figure 7:
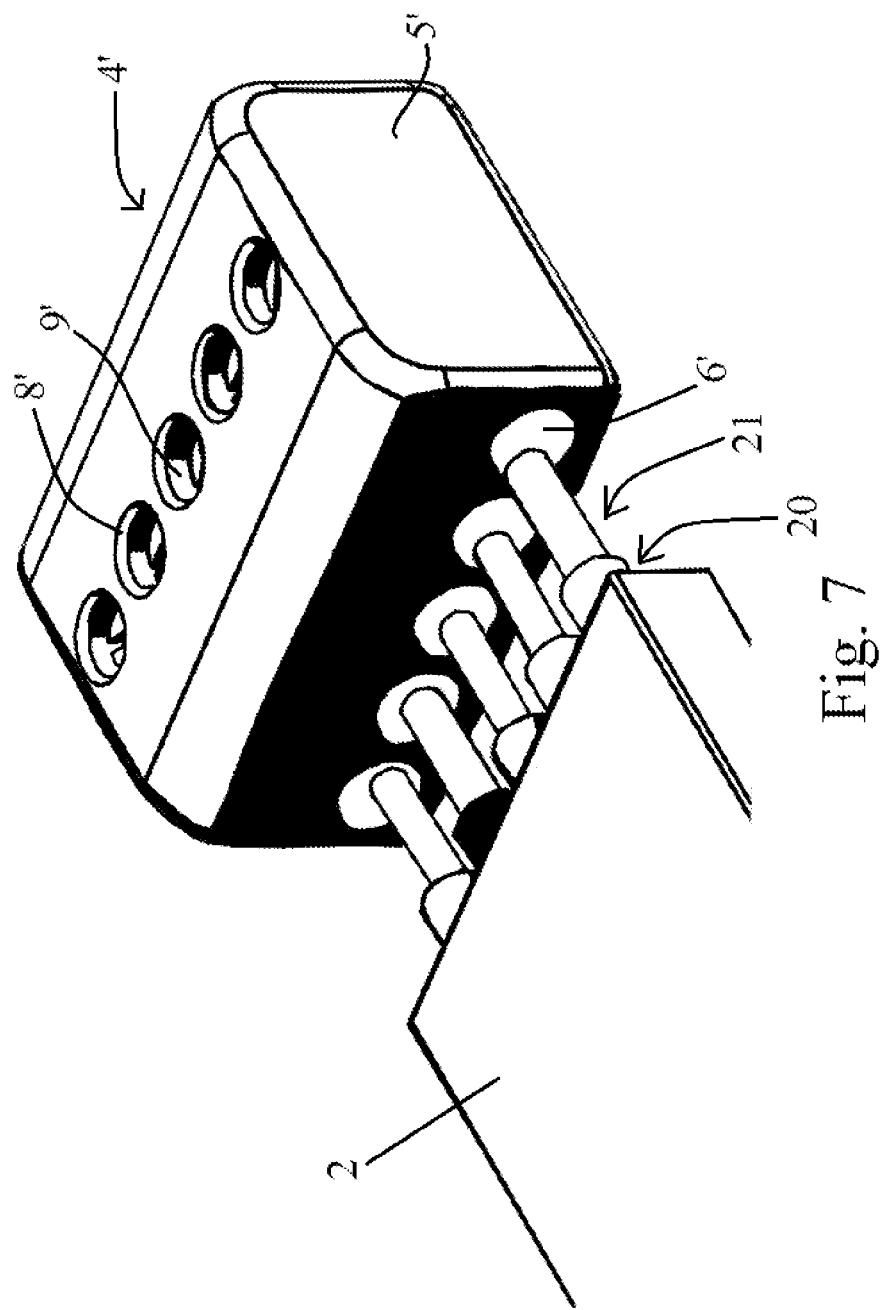
FIG. 7 shows the clamping sleeve from FIG. 7 together with a flat cable that is to be contacted by the clamping sleeve.

The clamping sleeve 4', designed as a cable end piece and already described in conjunction with FIG. 6, is illustrated in FIG. 7 together with a flat cable 2 to be contacted, whose end piece is intended to ultimately form the clamping sleeve 4'. The clamping sleeve has openings 6' in the insulator situated upstream from the cavities in the insulator 5' illustrated in FIG. 6. These openings 6' have a conical cross section (not visible in FIG. 7) that tapers toward the cuboidal contact elements 7', likewise not visible, which are inserted into the insulator 5', behind the openings. The metallic slotted screws 8' are illustrated in FIG. 7 in the tightened or almost tightened position. The cable cores 20 together with the core conductors 21 of the flat cable 2 are placed in the direction of the openings 6' in the insulator. FIG. 7 thus represents a step prior to the actual installation of the clamping sleeve 4' as a cable end piece.

Figure 8:
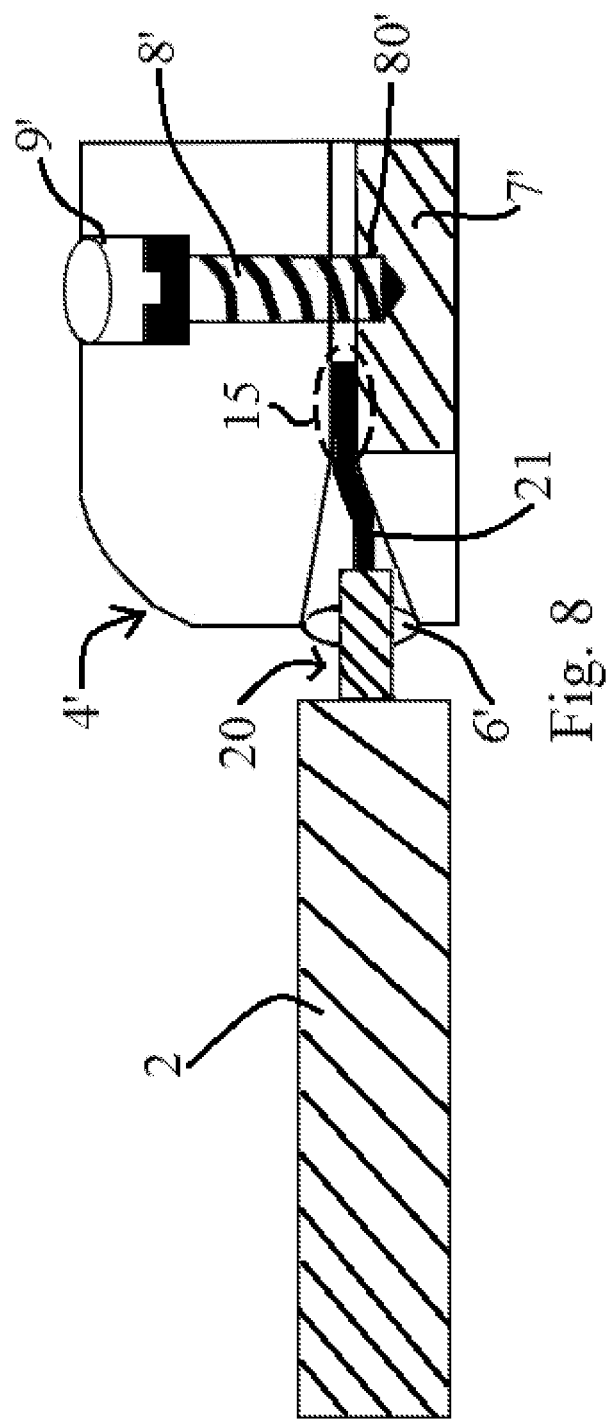
FIG. 8 shows the clamping sleeve, contacting a flat cable, from FIGS. 7 and 8 in a side sectional view.

FIG. 8 shows a flat cable 2 that is inserted with its cable core 20 and core conductor 21 into the cable end piece, in particular in the contacted state, i.e., in a state in which the core conductors 21 are clamped by the clamping sleeve 4' according to FIGS. 6 and 7.

The cable core 20 of the flat cable 2 together with the core conductor 21 is inserted into the opening 6' in the insulator 5'. As is apparent in the sectional view in FIG. 8, the opening 6' has a conical cross section and runs in the direction of the cuboidal contact element 7'. Thus, as illustrated in FIG. 8, the core conductor 21, which is not exactly lined up with the clamping point 15, is still guided toward the clamping point 15 via the opening 6'. The clamping point 15 is situated between the upper edge of the cavity in the insulator 70' and the cuboidal contact element 7'. As already described above, the slotted screw 8' fixes the cuboidal contact element 7' in position due to the fact that the slotted screw 8' that is guided through the screw hole 9 in the insulator 5' is screwed into the thread 80 of the cuboidal contact element 7'.

Figure 9:
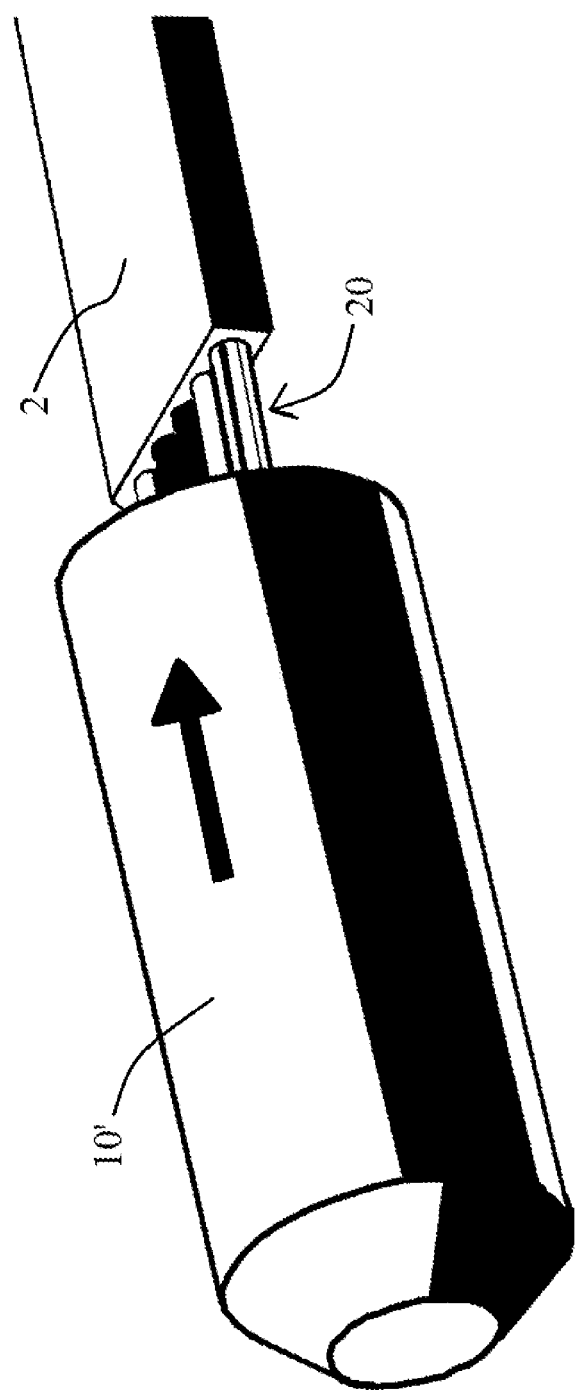
FIG. 9 shows a shrink cap that is pulled over a contact between a clamping sleeve as a cable end piece, and a flat cable.

FIG. 9 schematically illustrates a heat shrink tube 10', designed as a shrink cap, being pushed over the clamping sleeve 4', designed as a cable end piece, and the portion of a flat cable 2 that protrudes into the clamping sleeve (see arrow direction in FIG. 9). The portion that protrudes into the clamping sleeve includes flat cable cores 20 and also up to 50 centimeters of the flat cable 2.

Lastly, FIG. 10 illustrates the shrink cap 10', shown in FIG. 9, in the shrunken-on state. The shrink cap 10' has been pulled over a clamping sleeve 4' as a cable end piece (concealed in FIG. 10 by the shrink cap 10') and an entering area of the flat cable 2, and shrunk on as described in conjunction with FIG. 9. A cable termination 100 of the flat cable 2 is produced in this way.

The invention claimed is:

1. A cable connector for connecting two multicore cables, namely, two flat cables or one flat cable and one round cable, comprising:
   (a) clamping sleeve that includes:
      (i) a ceramic insulator with at least two openings, one on each side of the clamping sleeve, for accommodating core conductors, wherein the ceramic insulator has the shape of an upright arch, and wherein the openings are inserted into the arch,
      (ii) at least two contact inserts that are conductive inserts made of metal and that pass through the clamping sleeve at corresponding openings on both sides, wherein clamping elements are associated with each of the least two contact inserts in order to clamp the core conductors on one side or the other side of the contact inserts, and thus to establish electrical contact between the clamping sleeve and the multicore flat cable or round cable, thereby connecting the two cables, wherein the openings in the ceramic insulator only partially enclose the conductive inserts, so that the clamping elements are mountable on the conductive inserts in the area that is not enclosed; and
   (b) a heat shrink tube including a thermoplastic material, wherein the heat shrink tube envelops the entering portions of the cables and the clamping sleeve, and in the shrunken state lies tightly against an outer contour of the clamping sleeve and an outer contour of the portion of the cables that enters the clamping sleeve, wherein the heat shrink tube in the shrunken state has essentially the same distance from each closest opening of the ceramic insulator.

2. The cable connector according to claim 1, wherein the heat shrink tube includes polyethylene.

3. The cable connector according to claim 1, wherein the openings in the ceramic insulator have a circular cross-section, and the conductive inserts are designed as tubes that are inserted through the boreholes.

4. The cable connector according to claim 3, wherein the clamping elements are screws, wherein the tubes have at least one screw thread into which the screws are screwable, so that they clamp a core conductor, inserted into the opening, between the screw and the inner side of the tube.

5. The cable connector according to claim 1, wherein the clamping sleeve connects a flat cable to a flat cable, or a flat cable to a round cable, wherein for the connection of two flat cables, the heat shrink tube in the shrunken state lies tightly against the portion of the two flat cables entering the clamping sleeve and the clamping sleeve, and for the connection of a round cable to a flat cable, the heat shrink tube lies tightly against the portion of the flat cable that enters the clamping sleeve, the portion of the round cable that enters the clamping sleeve, and the clamping sleeve.

6. A cable termination for the insulating termination of a multicore flat cable, comprising:
   (a) a clamping sleeve provided as a cable end piece, wherein the clamping sleeve includes:
      (i) a ceramic insulator with at least two openings on one side of the clamping sleeve, wherein each opening is configured to accommodate a core conductor of the multicore flat cable,
      (ii) at least two contact inserts, each contact insert situated behind a respective one of the openings, wherein a clamping element is associated with each of the contact inserts in order to clamp the core conductor on a respective one of the contact inserts and thus establish mechanical fixing of the core conductor on the clamping sleeve so as to electrically insulate core conductors of the multicore flat cable from one another, and thus to terminate the cable, wherein each of the contact inserts has a cuboidal design and is made of metal, and has screw threads by which the clamping element, which is designed as a screw, is screwable in order to clamp the core conductor at a clamping point between the contact insert and the ceramic insulator, wherein a top side of each of the contact inserts is used as a support surface for the core conductor that is inserted into the clamping sleeve, wherein the support surface is used as the clamping point; and
   (b) a heat shrink tube that envelops the entering portions of the cable and the clamping sleeve, and in the shrunken state lies tightly against an outer contour of the clamping sleeve and an outer contour of the portion of the cable that enters the clamping sleeve, wherein the heat shrink tube is terminated on one side and is thus designed as a shrink cap.

7. The cable termination according to claim 6, wherein the contact inserts are conductive inserts.

8. The cable termination according to claim 6, wherein the heat shrink tube includes a thermoplastic material.

9. The cable termination according to claim 8, wherein the heat shrink tube includes polyethylene.

10. The cable termination according to claim 6, wherein the openings in the insulator have a conical cross section in order to guide the core conductor in the direction of the clamping point.

11. The cable connector or the cable termination according to claim 6, wherein functional integrity, i.e., connection of the two cables without short circuits or insulating fixing of the core conductors at the cable end in the event of fire, is ensured by the ceramic design of the insulator and the metallic design of the contact inserts and their direct embedding in the ceramic insulator.

\* \* \* \* \*